(12) United States Patent
Brück (10) Patent No.: US 10,677,133 B2
(45) Date of Patent: Jun. 9, 2020

(54) TANK SYSTEM FOR A REDUCING AGENT

(71) Applicant: Continental Automotive GmbH, Hannover (DE)

(72) Inventor: Rolf Brück, Bergisch Gladbach (DE)

(73) Assignee: Continental Automotive GmbH, Hannover (DE)

( * ) Notice: Subject to any disclaimer, the term of this patent is extended or adjusted under 35 U.S.C. 154(b) by 65 days.

(21) Appl. No.: 16/063,362

(22) PCT Filed: Dec. 13, 2016

(86) PCT No.: PCT/EP2016/080711
§ 371 (c)(1),
(2) Date: Jun. 18, 2018

(87) PCT Pub. No.: WO2017/102672
PCT Pub. Date: Jun. 22, 2017

(65) Prior Publication Data
US 2018/0371977 A1    Dec. 27, 2018

(30) Foreign Application Priority Data

Dec. 18, 2015  (DE) ........................ 10 2015 226 118

(51) Int. Cl.
*F01N 3/00* (2006.01)
*F01N 3/20* (2006.01)
(Continued)

(52) U.S. Cl.
CPC .............. *F01N 3/208* (2013.01); *B60K 13/04* (2013.01); *F01N 3/0842* (2013.01);
(Continued)

(58) Field of Classification Search
CPC ........ B60K 13/04; F01N 3/2066; F01N 3/208
(Continued)

(56) References Cited

U.S. PATENT DOCUMENTS

2012/0311999 A1* 12/2012 Hodgson ............... F01N 3/2066
60/295
2013/0263941 A1* 10/2013 Landes ................. F01N 3/2066
137/351
2016/0215668 A1    7/2016 Maguin

FOREIGN PATENT DOCUMENTS

CN         104024594        9/2014
DE     102008054803 A1     6/2010
(Continued)

OTHER PUBLICATIONS

Office Action dated Nov. 27, 2019 issued in India Patent Application No. 201837020558.

*Primary Examiner* — Jason D Shanske
(74) *Attorney, Agent, or Firm* — Cozen O'Connor (57) ABSTRACT

A tank system for a reducing agent includes: a vessel configured to store the reducing agent, the vessel having: an upper vessel wall, lateral vessel walls, and a lower vessel wall; and a conveying device, the conveying device being configured to provide the reducing agent under pressure by way of an outlet to an exhaust gas. One or more openings are arranged in the lower vessel wall, the one or more openings forming a connection to a further volume (V) filled with reducing agent. At least one opening of the one or more openings has radially inwardly directed elements arranged on a circumference of the at least one opening.

12 Claims, 6 Drawing Sheets

(51) Int. Cl.
  *B60K 13/04*  (2006.01)
  *F01N 3/08*  (2006.01)
  *B60K 15/03*  (2006.01)

(52) U.S. Cl.
  CPC .. *F01N 3/2066* (2013.01); *B60K 2015/03105* (2013.01); *F01N 2610/02* (2013.01); *F01N 2610/1406* (2013.01); *Y02A 50/2325* (2018.01); *Y02T 10/24* (2013.01)

(58) Field of Classification Search
  USPC .......................................................... 60/286
  See application file for complete search history.

(56) References Cited

FOREIGN PATENT DOCUMENTS

| | | |
|---|---|---|
| DE | 102009002209 A1 | 10/2010 |
| DE | 102009047101 A1 | 5/2011 |
| DE | 102013109805 A1 | 3/2015 |
| WO | WO 98/41415 | 9/1998 |
| WO | WO 2014/037210 | 3/2014 |

\* cited by examiner

TANK SYSTEM FOR A REDUCING AGENT

CROSS-REFERENCE TO RELATED APPLICATIONS

This is a U.S. national stage of application No. PCT/EP2016/080711 filed on 13 Dec. 2016, which claims priority to the Germany Application No. 10 2015 226 118.2 filed 18 Dec. 2015, the content of both incorporated herein by reference.

BACKGROUND OF THE INVENTION

1. Field of the Invention

The present invention relates to a tank system for a reducing agent.

2. Related Art

It is known for reducing agents to be added to exhaust gases of motor vehicles to reduce undesirable constituents, in particular nitrogen oxide compounds, of the exhaust gas. Such nitrogen oxide compounds are converted into other compounds such as nitrogen, water, and carbon dioxide. A urea solution, which is also available under the AdBlue trademark, is used as the reducing agent. In motor vehicles, a vessel composed of plastic is provided for the provision and storage of the urea solution. The vessel is connected to a conveying device. The conveying device is composed of a pump that suctions the reducing agent and dispenses the reducing agent under pressure into a conveying line. The urea solution passes via the conveying line to an injection device, which injects the urea solution into an exhaust line and into the exhaust gas flowing therein. The conveying device has further components such as fill level transducers, sensors, filters, and heating devices, which are provided for the safe and reliable operation of the tank system.

It is furthermore known for an opening to be incorporated in the vessel in order for the conveying device to be arranged in the interior of the vessel. The opening in the vessel is closable by a flange. The urea solution conveyed by the conveying device is guided out of the vessel and to the exhaust gas line via an outlet that is integrated in the flange. It is disadvantageous that complete emptying of the vessel is not possible in the case of the conveying device being arranged through an opening in the base of the vessel. Even if the conveying device is able to empty the vessel down to a fill level of a few millimeters in the vessel, a significant residual volume that is not conveyable remains in the vessel owing to the base area.

It is also known that the urea solution freezes at approximately −11° C. To ensure the provision of the reducing agent in all operating states, it is likewise known to provide a heating device. Here, it is the aim to dimension the heating device to be as small as possible in order to keep the energy consumption as low as possible but nevertheless permit adequate heating of the urea solution.

Here, the freezing characteristics of the reducing agent in the vessel play a crucial role. It is basically to be assumed that the outer regions freeze first, and the region situated centrally in the interior of the vessel freezes last. It is particularly critical here that the frozen reducing agent takes up a much larger volume than liquid reducing agent. As a result, reducing agent that freezes last, or else reducing agent situated in partitioned-off volumes, is impeded from expanding in volume as it freezes. As a result, in some cases, extremely high stresses arise which lead to damage, in particular to the conveying device. This has hitherto been counteracted by a corresponding arrangement and design of the heating device, which greatly increases the outlay for the tank system.

SUMMARY OF THE INVENTION

It is therefore an object of the invention to create a tank system of the type mentioned above, but which permits virtually complete emptying of the vessel, and furthermore, a conveying device that, with little outlay, is protected against damage resulting from freezing reducing agent.

The object may be achieved by a tank system according to an aspect of the invention that comprises a vessel for the reducing agent, having an upper vessel wall, lateral vessel walls, and a lower vessel wall, and comprises a conveying device in order for the reducing agent to be suctioned and to be provided so as to be suppliable under pressure via an outlet to an exhaust gas. At least one opening is arranged in the lower vessel wall, in that the at least one opening forms a connection to a further volume filled with reducing agent, and at least one opening has radially inwardly directed elements arranged on the circumference.

The arrangement of at least one opening in the lower vessel wall allows the overflow of the reducing agent over from the interior of the vessel into the further volume. From there, the reducing agent can be fed to the exhaust gas toy the pump belonging to the conveying device. With the arrangement of the volume, it is thus possible for the vessel to be virtually completely emptied. As the reducing agent situated in the volume freezes, the reducing agent abuts, owing to its increase in volume, against the boundaries of the volume. While the boundaries of the volume impede the further expansion, the freezing reducing agent can expand further at at least the opening by elastically deforming the elements arranged on the circumference of the opening. With the increase in volume of the reducing agent that is made possible in this way, stresses are reduced to such an extent that damage in the volume or in the vessel is prevented. A possibly required heating device can thus be dimensioned to be considerably smaller. The tank system according to the invention requires much lower outlay.

The elastic elements furthermore reduce the cross-sectional area of the opening, such that the openings must have a much larger circumference if they are intended to have the same cross-sectional area as an opening without such elements. With the increased circumference, openings with such elements extend over a much larger region of the vessel wall, such that ultimately larger regions of the vessel wall are protected against the critical stresses.

The outlay for producing the openings in the vessel can be reduced if not all openings are formed with elastically deformable elements. In one advantageous refinement, the at least one opening that is arranged relatively close to the center of the vessel is an opening having the deformable elements.

In a further refinement, in the case of vessels made of plastic, the elements can be produced particularly easily if they are formed in one piece with the vessel wall. In particular in the case of injection-molded vessels composed of at least two half-shells, the elements can be produced with the respective vessel shells during the injection molding process.

In the simplest case, the elements have the same thickness as the vessel wall. The molding tools for the production process are thus of simple design.

In another advantageous refinement, the elasticity of the elements can also be increased by virtue of the elements having a smaller thickness than the vessel wall.

To permit an adequate flow of the reducing agent over from the interior of the vessel into the volume, it has proven to be advantageous for the elements to have, along the diameter of the opening, a length of 0.2 to 0.9, preferably 0.4 to 0.7, times the diameter. Since the outlay for the production of the vessel increases with the number and size of the openings, the openings should be configured to be as small as possible. By contrast, to avoid stresses during the freezing of the reducing agent, large openings are advantageous. Taking into consideration such boundary conditions, large openings have elements with a length of up to 0.5 times the diameter, and small openings have elements with a length of up to 0.9 times the diameter.

For the corresponding deformability, the elements are, in a further refinement, arranged with a spacing to one another. Here, in a manner dependent on the form of the elements, the spacings are configured to be constant over the length of the elements or to increase or decrease. The elements may be of triangular, trapezoidal, rectangular or parallelogram-shaped form. Shapes with rounded boundaries are likewise conceivable.

Depending on the size of the opening and of the required flow cross section, the width of the spacing between two elements may, in one advantageous refinement, amount to between 1.0 and 0.05 times the width of an element.

The elasticity of the elements can also be increased by virtue of the spacing between two elements in the region of the circumference of the opening being greater than the directly adjoining region of the spacing. At the same time, with this construction, the free throughflow area radially at the outside can be considerably enlarged. This has a positive effect during the thawing of the reducing agent, because the warming via the reducing agent is better than through the vessel wall.

To permit deformability of the vessel wall as a result of the volume expansion of freezing reducing agent, at least one element is necessary. In turn, in the case of more than ten elements, the outlay in terms of production increases, without it being possible to significantly reduce yet further the already considerably reduced stresses.

BRIEF DESCRIPTION OF THE DRAWINGS

The invention will be discussed in more detail on the basis of multiple exemplary embodiments. In the figures:

FIG. 9-10B show further embodiments of the tank system.

DETAILED DESCRIPTION OF THE PRESENTLY PREFERRED EMBODIMENTS

Figure 1:
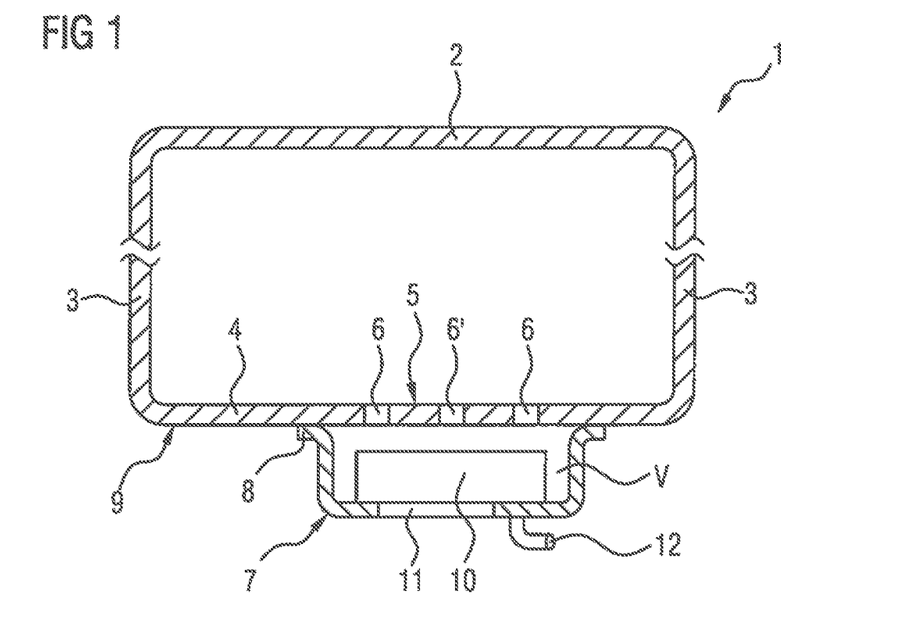
FIG. 1: is a schematic illustration of the tank system according to the invention.

FIG. 1 shows a tank system having a vessel 1 which in the installed position has an upper vessel wall 2, a filling portion (not illustrated) for the reducing agent, lateral vessel walls 3, and a lower vessel wall 4. The lower vessel wall 4 forms the base of the vessel 1. The vessel 1 is composed of plastics. Openings 6 are arranged in a planar base region 5 of the lower vessel wall 4. A conveying device 7 is situated outside the vessel 1. The conveying device 7 has a flange 8, which surrounds said conveying device and which is welded to the outer side 9 of the vessel 1. The conveying device 7 together with the outer side 9 of the vessel 1 encloses a chamber, such that the conveying device 7 and the outer side 9 form a volume V. The vessel 1 is thus not penetrated by the conveying device 7. The volume V is connected to the interior of the vessel 1 by the openings 6 in the lower vessel wall 4. In this way, urea solution stored in the interior of the vessel can flow through the vessel wall 4 to the outside into the volume V. The conveying device 7 has a housing 10, in or on which there can be arranged various components (not illustrated in any more detail), for example a pump, pressure regulators, heating devices, filters, fill level and quality sensors. The housing 10 furthermore comprises a lid 11, which closes the housing 10. By the pump, the urea solution situated in the volume V can be suctioned and supplied under pressure via an outlet 12 into a conveying line of an exhaust line, in which conveying line the urea solution is admixed to the exhaust gas. Owing to the exposed position of the conveying device 7 on the outer side of the vessel 1, the volume V is relatively sensitive to temperature influences. In particular in the presence of low temperatures, the volume V freezes before the adjacent volume in the interior of the vessel 1. The associated volume enlargement in the volume V has the effect that, owing to the two outer openings 6, the volume V can expand in the direction of the vessel 1, whereby critical stresses in the volume V and thus in the conveying device are avoided. In relation to the volume V, the urea solution freezes last in the region of the central opening 6', which is arranged relatively close to the center of the vessel 1, and the urea solution would press against the outer side 9 of the vessel wall 4 in the base region 5. The construction of the opening 6' according to the invention prevents this. The form of the opening 6' will be described with reference to the following figures.

Figure 2:
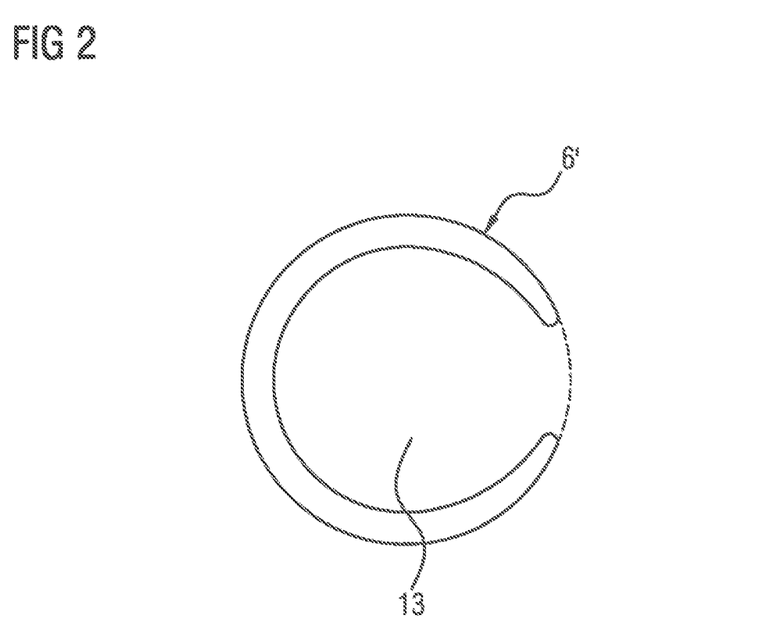
FIGS. 2-8: show different openings in the vessel.
Figure 3:
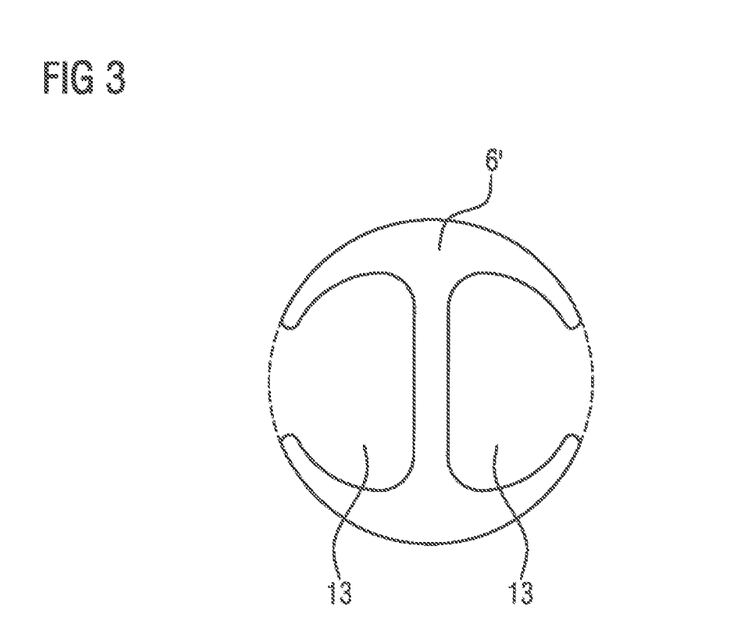
Figure 4:
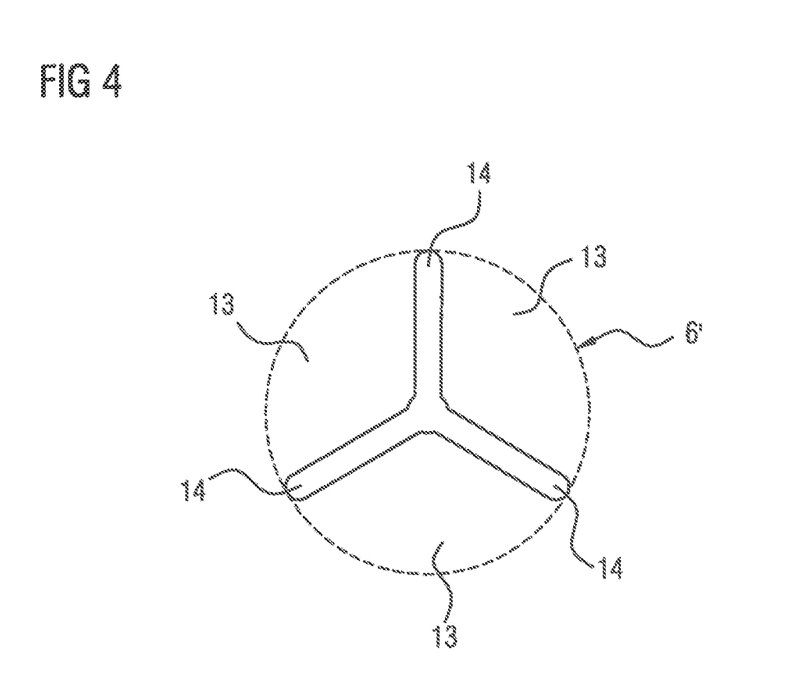
Figure 5:
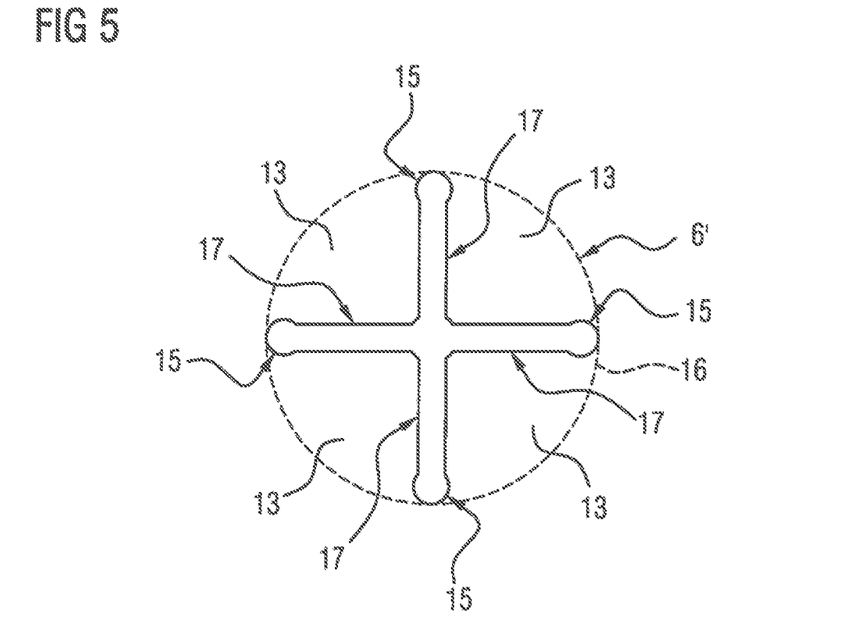

FIG. 2 shows an opening 6' with an element 13 that has a length of 0.8 times the diameter of the opening 6'. FIG. 3 shows an opening 6' with two elastically deformable elements 13. FIG. 4 illustrates three elastic elements 13. The trapezoidal elements 13 are arranged spaced apart from one another, wherein the spacings are formed as slots 14 that have boundaries running parallel. In FIG. 5, four elements 13 are arranged in an opening 6'. The spacing between two elements 13 in the region 15 of the circumference 16 of the opening 6' is greater than the directly adjoining region 17.

Figure 6:
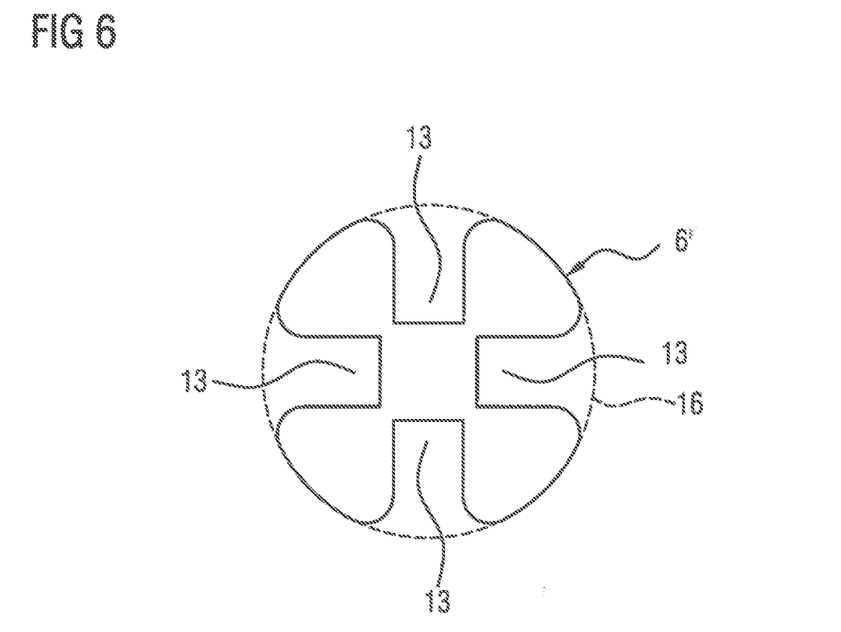
Figure 7:
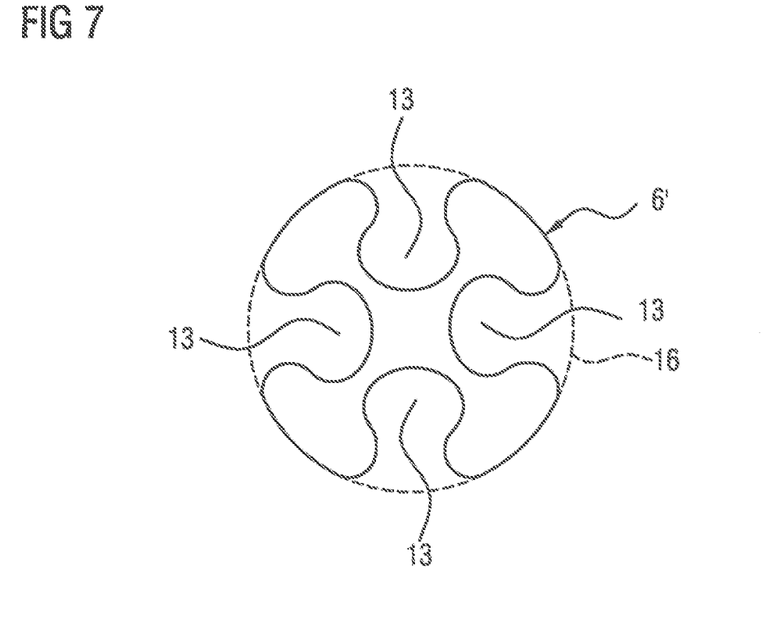
Figure 8:
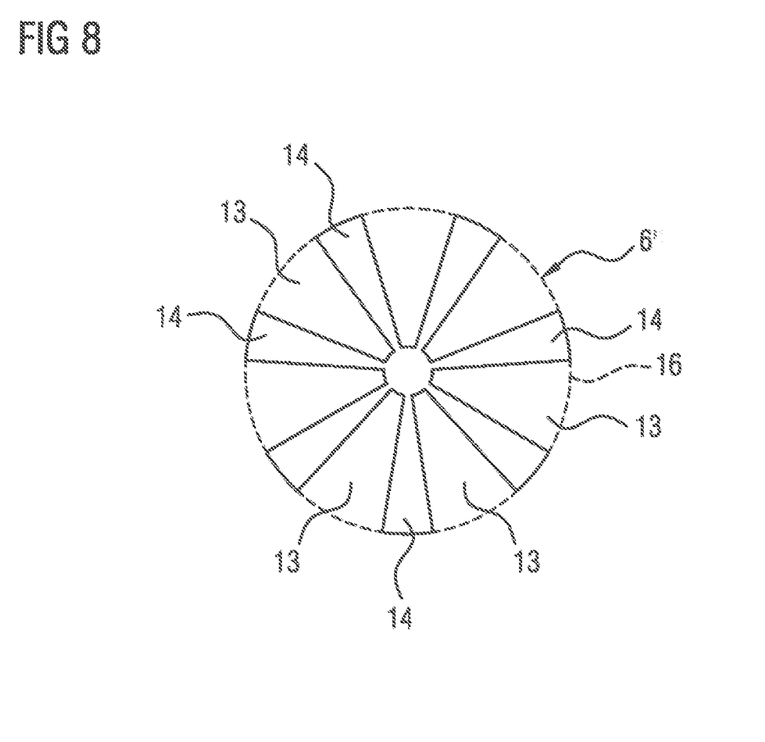

FIGS. 6 to 8 show further refinements of the elements 13.

Figure 9:
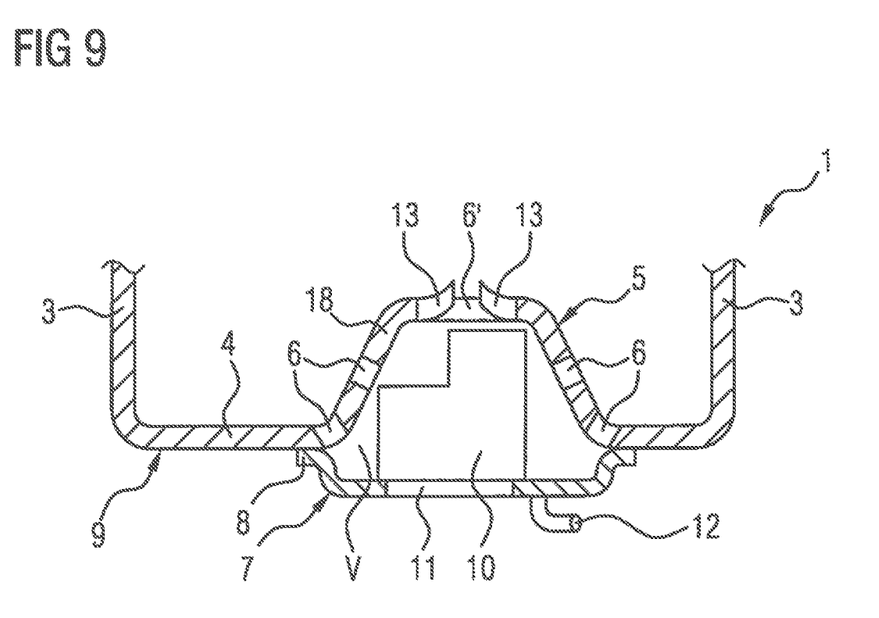

The vessel in FIG. 9 is of a construction similar to that in FIG. 1. The base region 5 is configured as an inwardly protruding portion 18 that is directed into the interior of the vessel 1. Owing to this inwardly protruding portion 18, the volume of the vessel 1 is smaller than in the case of a planar design of the base region 5 as in FIG. 1. The conveying device 7 is arranged on the outer side 9 of the vessel 1 in the base region 5, the flange 8 of the conveying device being welded to the outer side 9 such that the conveying device 7 and the outer side 9 of the vessel 1 form the volume V. The connection to the interior of the vessel is realized via openings 6, which are arranged so as to be distributed over the inwardly protruding portion 18. Owing to this distribution, the openings 6, 6' are arranged with different spacings to the lower vessel wall 4. The housing 10 with the components arranged therein extends in the direction of the vessel 1 and thus projects into the region excluded by the inwardly protruding portion 13. The tank system thus requires less installation space toward the bottom. Here, the conveying device 7 is still, as in FIG. 1, arranged entirely outside the vessel 1. For simpler production of the vessel 1 as a result of improved demolding capability, the inwardly protruding portion 13 is of conical form. Here, the opening 6' is arranged centrally in the inwardly protruding portion 18. The elements 18 as per FIG. 4 are illustrated in the elastically deformed state.

Figure 10A:
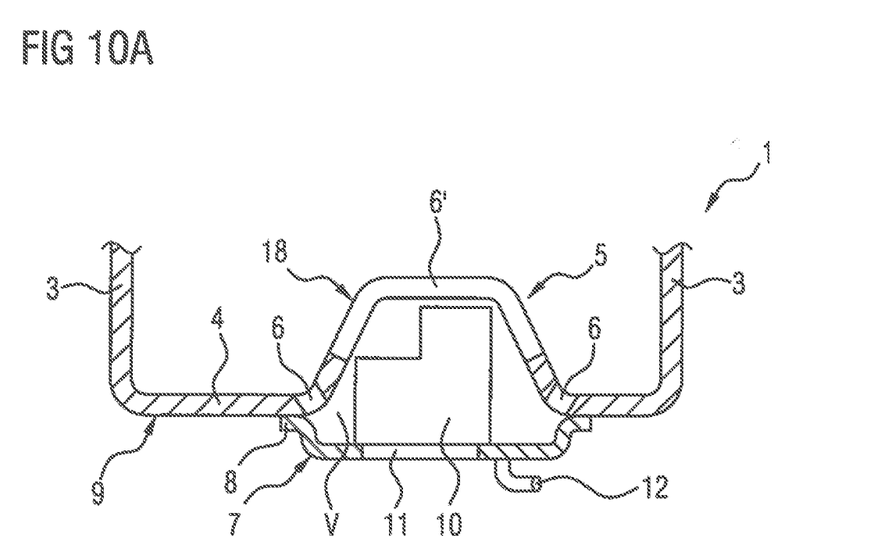
Figure 10B:
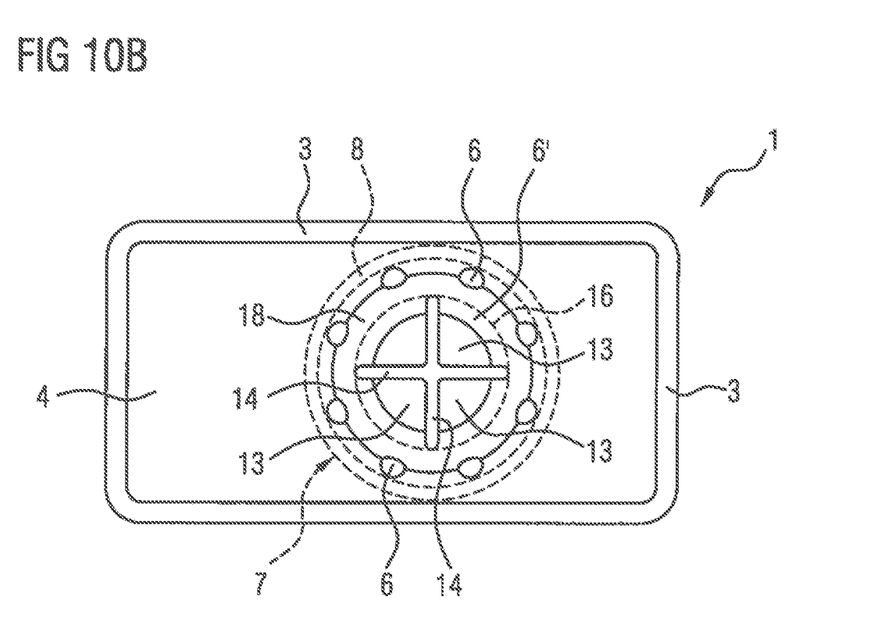

FIGS. 10A, 10B show a further embodiment with a much larger opening 6', wherein FIG. 10A shows a section in accordance with FIG. 9 and FIG. 10B shown a plan view of FIG. 10A. It can be seen here that the slots 14 extend from the upper, planar region into the region of conical form of the inwardly protruding portion 18.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should toe recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tank system for a reducing agent, comprising:
    a vessel (1) configured to store the reducing agent, the vessel (1) having:
        an upper vessel wall (2),
        lateral vessel walls (3), and
        a lower vessel wall (4); and
    a conveying device (7), the conveying device (7) being configured to provide the reducing agent under pressure by way of an outlet to an exhaust gas,
    wherein:
    a plurality of openings (6, 6') are arranged in the lower vessel wall (4),
    the plurality of openings (6, 6') form a connection to a further volume (V) filled with reducing agent, and
    a centrally arranged one (6') among the plurality of openings (6, 6') has radially inwardly directed elastically-deformable elements (13) arranged on a circumference (16) of said centrally arranged opening (6').

2. The tank system as claimed in claim 1, wherein said centrally arranged opening (6') is an opening arranged proximate the center of the vessel (1).

3. The tank system as claimed in claim 1, wherein the elastically-deformable elements (13) are formed in one piece with the lower vessel wall (4).

4. The tank system as claimed in claim 1, wherein the elastically-deformable elements (13) have the same thickness as that of the lower vessel wall (4).

5. The tank system as claimed in claim 1, wherein the elastically-deformable elements (13) have a smaller thickness than that of the lower vessel wall (4).

6. The tank system as claimed in claim 1, wherein the elastically-deformable elements (13) have, along a diameter of said centrally arranged opening (6'), a length of 0.2 to 0.9 times the diameter.

7. The tank system as claimed in claim 1, wherein the elastically-deformable elements (13) are arranged spaced apart from one another by a spacing width.

8. The tank system as claimed in claim 7, wherein the spacing width between two elastically-deformable elements (13) is between 1.0 and 0.05 times the width of an elastically-deformable element (13) from among the elastically-deformable elements (13).

9. The tank system as claimed in claim 7, wherein the spacing width between two elastically-deformable elements (13) in a region (15) of the circumference (16) of said centrally arranged opening (6') is greater than a directly adjoining region (17) of spacing.

10. The tank system as claimed in claim 1, wherein one to ten elastically-deformable elements (13) are arranged on said centrally arranged opening (6').

11. The tank system as claimed in claim 1, wherein the elastically-deformable elements (13) have, along a diameter of said centrally arranged opening (6'), a length of 0.4 to 0.7 times the diameter.

12. The tank system claimed in claim 1, wherein the centrally arranged opening (6') is surrounded circumferentially by the plurality of openings (6) that do not comprise the centrally arranged one (6') among the plurality of openings.

* * * * *